United States Patent [19]
Fujimoto et al.

[11] 3,725,353
[45] Apr. 3, 1973

[54] AMINO ACID-URETHANE POLYMER COMPOSITIONS

[75] Inventors: Yasuo Fujimoto, Yokohama; Isao Masumura, Tokyo; Keizo Tatsukawa, Tokyo; Shinsuke Koshimoto, Tokyo; Toru Doiuchi, Tokyo, all of Japan

[73] Assignee: Kyowa Hakko Kogyo Co., Ltd., Tokyo, Japan

[22] Filed: Apr. 12, 1971

[21] Appl. No.: 133,393

[30] Foreign Application Priority Data

Apr. 17, 1970  Japan .................................45/32358

[52] U.S. Cl....260/75 NK, 260/75 NA, 260/77.5 CA
[51] Int. Cl. ...............................................C08g 22/00

[58] Field of Search ......260/77.5 CA, 75 NK, 75 NA

[56] References Cited

UNITED STATES PATENTS 3,594,351  7/1971  Uchida et al..................260/77.5 CA Primary Examiner—Donald E. Czaja
Assistant Examiner—M. J. Welsh
Attorney—Ward, McElhannon, Brooks & Fitzpatrick

[57] ABSTRACT

Improved amino acid-urethane polymer compositions containing the reaction product of an intermediate polymer, obtained by the reaction of a polyesterpolyol with a polyisocyanate compound, and an amino acid N-carboxy anhydride or a polyamino acid and processes for the preparation of these compositions.

12 Claims, No Drawings

AMINO ACID-URETHANE POLYMER COMPOSITIONS

This invention relates to improved amino acid-urethane polymer compositions having excellent stretchability, adhesiveness and elastic resilience and processes for their preparation. This invention is characterized by reacting an intermediate polymer containing isocyanate groups, obtained by the reaction of a polyesterpolyol the terminal groups of which are substantially all hydroxyl groups and a polyisocyanate compound with an amino acid N-carboxy anhydride (which will be hereinafter referred to as ANCA, wherein A stands for an amino acid and NCA for an N-carboxy anhydride) represented by the general formulas:

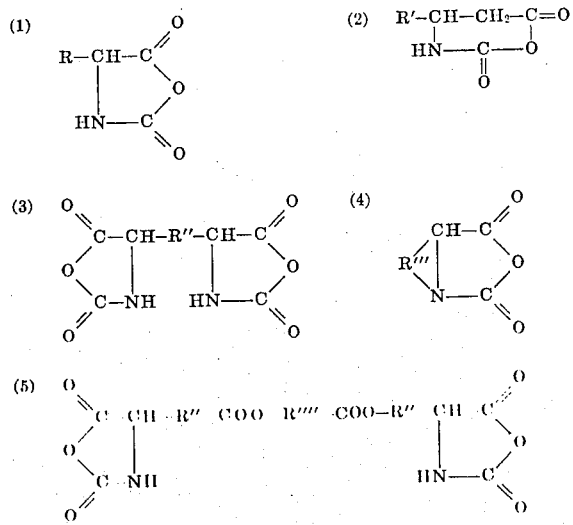

wherein R and R' represent hydrogen or monovalent hydrocarbon groups such as alkyl groups containing from 1 to 6 carbon atoms, aralkyl groups containing from 6 to 10 carbon atoms, hydroxyalkyl groups of the formula —CH$_2$)nOH wherein n is an integer from 1 to 6, hydroxy-aralkyl groups containing from 6 to 10 carbon atoms, thioalkyl groups containing from 1 to 6 carbon atoms (the thio substituent may be substituted), amino alkyl groups containing 1 to 6 carbon atoms (the amino sub-stituent may be substituted), groups of the formula -(CH$_2$)nCOOR$_a$ wherein n is an integer from 1 to 6 and R$_a$ is alkyl, cycloalkyl or aralkyl containing from 1 to 8 carbon atoms, groups of the formula

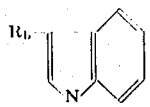

wherein R$_b$ is alkylene containing from 1 to 6 carbon atoms (the

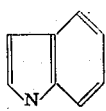

substituent may be substituted), groups of formula

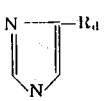

wherein R$_d$ is alkylene containing from 1 to 6 carbon atoms (the

substituent may be substituted), groups of formula

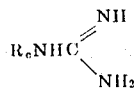

wherein R$_c$ is alkylene containing from 1 to 6 carbon atoms (the guanido substituent may be substituted); R'', R''' and R'''' represent divalent hydrocarbon groups such as alkylene groups containing from 1 to 6 carbon atoms. These groups may contain other substituents. The intermediate polymer may also be reacted with a polyamino acid solution obtained by the polymerization of ANCA or its derivatives (hereinafter referred to as "polyamino acid").

It is known that polyamino acids exhibit properties similar to those of natural leather such as moisture permeability, feel, touch, etc., when the polyamino acid is made into a film or coated onto a substrate cloth such as a woven or non-woven fabric. However, it has a disadvantage in that its use in clothing is considerably difficult because it does not have sufficient stretchability and elastic resilience. Further, when it is coated onto a woven or non-woven fabric or used as a leather, it is necessary to use an additional adhesive, because the polyamino acid itself is not sufficiently adhesive, and the selection of a proper adhesive is difficult. As a result of extensive studies of methods of improving these disadvantages, the present inventors have found that a modified amino acid-urethane polymer exhibits a remarkable improvement in stretchability, adhesiveness and elastic resilience, as well as retaining the innate excellent features possessed by the polyamino acids.

The present invention will now be explained in detail. A suitable amount of a hydroxyl-terminated polyesterpolyol and a suitable amount of a polyisocyanate compound, preferably a diisocyanate compound, are reacted to prepare an intermediate polymer containing isocyanate groups at the terminals (which will be referred to hereinafter as "prepolymer"), and a suitable amount of ANCA is reacted with the prepolymer, whereby a polymer solution is obtained. In place of the ANCA, a polyamino acid solution obtained by polymerizing ANCA with a suitable polymerization initiator may be used. Further, said polyamino acid may be added to the prepolymer and reacted, and then the ANCA may be added thereto for a further reaction.

The polyesterpolyols useful in the present process consist of a polybasic acid and a polyol. The simplest general formula of the polyesterpolyols is represented as follows:

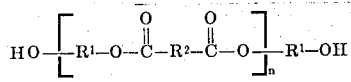

wherein R$^1$ and R$^2$ represent the same or different divalent hydrocarbon groups such as aliphatic, alicyclic and aromatic groups, including aliphatic groups having aromatic residues, and n represents an integer such that the molecular weight of the compound is in the range of about 200 – 10,000. A polyesterpolyol prepared from one or more acid components properly selected from dibasic acids or tribasic acids, and one or more OH components properly selected from diols or triols are preferably used. A polyesterpolyol having a ratio of molecular weight to number of OH groups in the range of 300 to 1,200 is particularly desirable.

Typical polyesterpolyols useful in the present invention include polyesterpolyols obtained by a dehydration-condensation (esterification) reaction of a single compound or a mixture of compounds selected from diols having 2 to 20 carbon atoms, for example, alkylene and polyalkylene glycols such as ethylene glycol, propylene glycol, trimethylene glycol, butylene glycol, 1,3-butanediol, tetramethylene glycol, pentamethylene glycol, hexamethylene glycol, heptamethylene glycol, octamethylene glycol, diethylene glycol, dipropylene glycol, dibutylene glycol, di-(trimethylene glycol), di-(tetramethylene glycol), di-(hexamethylene glycol), triethylene glycol, tripropylene glycol, tri-(hexamethylene glycol); dioxyacetone; aromatic diols such as dihydroxybenzenes for example, 1,4-dihydroxybenzene, dihydroxytoluenes, 4,4'-dihydroxydiphenylmethane, di-(hydroxymethyl) benzenes, di-(hydroxymethylphenyl) methanes, dihydroxynaphthalenes, dihydroxydecahydro-naphthalenes sold under the trademark "Decalin"; dimethylolbenzenes, for example, 1,4-dimethylolbenzene; cycloalkanols such as dihydroxycyclopentanes, for example 1,3-dihydrooxycyclopentane; dihydroxycyclohexanes, for example, 1,4-dihydroxycyclohexane, dimethylolcyclohexanes, for example, 1,4-dimethylolcyclohexane, etc., and triols having 3 to 20 carbon atoms, for example, polyalkylene triols such as glycerine, trimethylolethane, trimethylolpropane, trimethylolbutane, butanetriols such as 1,2,4-butanetriol and trimethylolmethane, pentanetriols such as 1,3,5-pentanetriol and trimethylolethane, hexanetriols such as 1,3,5-hexanetriol, cycloalkylene triols, for example, trihydrooxycyclohexanes such as 1,3,5-trihydroxycyclohexane, trimethylolcyclohexanes such as 1,3,5-trimethylolcyclohexane, and the like; aromatic triols, for example, trihydroxybenzenes such as 1,3,5-trihydroxybenzene, trihydroxynaphthalenes, and the like; or one or more of polyetherpolyols obtained by dehydration-condensation of one or more of the above polyol components [including polyetherpolyols having substantially the same structure as those obtained in the above method from compounds other than the polyols, for example, epoxides, alkylene oxides, polyalkylene oxides, cyclic ethers, etc., and the polyol]; with a compound or a mixture of compounds selected from dicarboxylic or substituted dicarboxylic acids having 2 to 20 carbon atoms, for example, malonic acid, succinic acid, maleic acid, fumaric acid, glutaric acid, α-ketoglutaric acid, α-hydroxyglutaric acid, adipic acid, pimelic acid, azelaic acid, suberic acid, sebacic acid, brassylic acid, diglycolic acid, itaconic acid, citraconic acid, mesaconic acid, glutaconic acid, malic acid, tartaric acid, acetone dicarboxylic acid, dimerized linoleic acid, muconic acid, α,α'-dimethylmuconic acid, phthalic acid, terephthalic acid, toluene dicarboxylic acids such as 2,5-toluene dicarboxylic acid, biphenyl dicarboxylic acid, naphthalene dicarboxylic acids such as 1,8-naphthalene dicarboxylic acid, di-(carboxymethyl) benzenes such as 1,4-di-(carboxymethyl) benzene, cyclopentane dicarboxylic acids such as 1,3-cyclopentane dicarboxylic acid, cyclohexane dicarboxylic acids such as 1,4-cyclohexane dicarboxylic acid, di-(carboxymethyl) cyclohexanes such as 1,4-di-(carboxymethyl) cyclohexane, and tricarboxylic acids, for example, citric acid, isocitric acid, aconitic acid, tricarballylic acid, oxalosuccinic acid, benzene tricarboxylic acid, and the like. Further, reaction products having compositions substantially similar to those of said polyesterpolyols, prepared by reacting after proper selection compounds, other than said polyols and polycarboxylic acids, for example, alkylene oxides such as ethylene oxide, propylene oxide, butylene oxide, etc.; epoxyalkyl compounds such as 1,2-epoxypentane, 2,3-epoxypentane, 1,2-epoxyhexane, 2,3-epoxyhexane, etc.; cyclic ethers such as tetrahydrofuran, 2,5-dimethyltetrahydrofuran, 2,4-dimethyl-3-hydroxymethyltetrahydrofuran, dioxane, etc.; acid anhydrides such as succinic anhydride, glutaric anhydride, adipic anhydride, pimelic anhydride, furmaric anhydride, maleic anhydride, chlorendic anhydride, muconic anhydride, phthalic anhydride, etc.; polyesters such as dialkyl ester of succinic acid, dialkyl ester of adipic acid, ethylene glycol ester of 4,4-bis-(hydroxyphenyl) butyric acid, diethylene glycol ester of di[4,4-bis-(hydroxyphenyl) valeric acid], dipropylene glycol ester of 4,4-bis-(3-methyl-4-hydroxyphenyl) valeric acid, dialkyl ester of terephthalic acid, castor oil, etc.; lactones such as caprolactone, propiolactone, butyrolactone, valerolactone, methylcaprolactone, etc; and the like can also be used.

Any well-known organic polyisocyanate can be used as the organic polyisocyanate, but preferably aliphatic, alicyclic or aromatic diisocyanates (including aliphatic diisocyanates having aromatic residues) are used. Further, triisocyanates, tetraisocyanates, etc. can be used, but they have a tendency to reduce the stretchability. Preferable diisocyanate compounds include: aliphatic and aromatic diisocyanate compounds containing ester groups, for example, lysine diisocyanate methyl ester, ornithine diisocyanate methyl ester; hexane-1,6-diisocyanate, dicyclohexylmethane-4,4'-diisocyanate, methylcyclohexane diisocyanate, isophorone diisocyanate, dimeryl diisocyanate made from a 36-carbon dimer aliphatic dibasic acid sold under the trademark "DDI Diisocyanate", phenylenediisocyanates, tolylene diisocyanates, 1-chloro-2,4-phenylene diisocyanate, naphthylene diisocyanates, xylylene diisocyanates, dianisidine diisocyanate, 3,3'-dimethyl-4,4'-diphenylmethane diisocyanate, 4,4'-biphenylene diisocyanate, 3,3'-dichloro-4,4'-biphenylene diisocyanate, 3,3'-dimethyl-4,4'-biphenylene diisocyanate, diphenylsulfone-4,4'-diisocyanate, diphenylmethane-4,4'-diisocyanate, tolylene diisocyanate dimer, tolylene diisocyanate trimer, triphenylmethane-4,4',4"-triisocyanate, reaction products of trimethylol or hexane-1,2,6-triol, etc. with said diisocyanates, and polymethylene polyphenyl isocyanate, etc. If desired, a mixture of two or more diisocyanate compounds can be used. However, in selecting the diisocyanate, it should be noted that generally polymers comprising a polyisocyanate and a polyol as the base, that is, the so-called polyurethanes, have the disadvantage of undergoing deterioration or discoloration when exposed to atmospheric conditions such as sunlight and the like. In particular, these tendencies are observed when an aromatic polyisocyanate, for example, tolylene diisocyanate, diphenylmethane-4,4'-diisocyanate, etc., is used. Therefore, it is desirable to select the diisocyanate in accordance with the proposed use of the product. When aliphatic diisocyanates, particularly aliphatic diisocyanates having an ester group, such as lysine diisocyanate alkyl ester, ornithine diisocyanate alkyl ester and the like, are used, the thus obtained modified polymer of amino acid-urethane undergoes considerably less discoloration on exposure to sunlight. Further, these polymers exhibit other desirable properties such as improved solvent resistance, etc. which are not obtained when other diisocyanates not containing the ester group are used. Furthermore, the isocyanate compound greatly increases the adhesive properties of the amino acid polymer. Typical aliphatic diisocyanate compounds having ester groups are listed below. By using any of these compounds in place of the compounds shown in the examples, similar desirable effects can be observed. The methyl, ethyl, n-propyl, isopropyl, n-butyl (and its isomers), n-pentyl (and its isomers), n-hexyl (and its isomers), n-octhyl (and its isomers), n-decyl (and its isomers), n-dodecyl (and its isomers), stearyl, palmityl, methoxymethyl, ethoxymethyl, 2-methoxyethyl, 2-ethoxyethyl, 2-propoxyethyl, 2-butoxyethyl, 3-methoxypropyl, 3-ethoxypropyl, 4-methoxybutyl, 4-ethoxybutyl, phenyl, benzyl, o-tolyl, m-tolyl, p-tolyl, phenylethyl, p-tolylmethyl, o-tolylmethyl, m-tolylmethyl, o-(2-chlorotolyl), 2-chloroethyl, 2-bromoethyl, 2-chloropropyl, 3-chloropropyl, 1,2-dichloropropyl, 2,3-dichloropropyl, cyclobutyl, cyclopropyl, cyclopentyl, cyclohexyl, cycloheptyl, cyclooctyl, cyclodecyl, cyclopentylmethyl, cyclohexylmethyl, cyclobutylmethyl, 2-methylcyclohexyl (and its isomers), and 2-methylcyclohexylmethyl (and its isomers) esters of 2,6-diisocyanate caproic acid (lysine diisocyanate), 2,4-diisocyanate butyric acid, 2,5-diisocyanate valeric acid (ornithine diisocyanate), 2,5-diisocyanate caproic acid, 2,7-diisocyanate heptanoic acid, 2,5-diisocyanate heptanoic acid, or 2,8-diisocyanate caprylic acid; and the dimethyl, diethyl, dipropyl (di-n-propyl and di-isopropyl), dibutyl (n-, iso- or tert-) dioctyl, didecyl, didodecyl, distearyl, diphenyl, dibenzyl, di-(o-tolyl), di-(m-tolyl), di-(β-phenylethyl), di-(p-tolylmethyl), di-[o-(2-chlorotolyl)], di-(2-chloroethyl), di-(2-chloropropyl), di-(3-chloropropyl), di-(2,3-dichloropropyl), di-(methoxymethyl), di-(2-methoxyethyl), di-(2-ethoxyethyl), di-(2-propoxyethyl), di-(2-butoxyethyl), di-(cyclohexyl), di-(cyclopentyl) and di-(cyclohexylmethyl) esters of 2,4-diisocyanato-glutaric acid, 2,5-diisocyanato-adipic acid, 2,6-diisocyanatopimelic acid, 2,7-diisocyanato-suberic acid, 2,9-diisocyanato-sebacic acid, 2,4-diisocyanato-adipic acid, or 2,4diisocyanato-pimelic acid; and such mixed diesters as the methyl-ethyl, methyl-propyl, methyl-butyl, ethyl-propyl, ethyl-butyl, n-propyl-isopropyl, propyl-butyl, phenyl-octyl, benzyl-stearyl and methyl-benzyl diesters of the above diisocyanates.

The compounds employed may be optical isomers or optically inactive. In the formation of a prepolymer having terminal isocyanate groups, the reaction between the polyesterpolyol and the diisocyanate can be carried out without the addition of a solvent or with a suitable inert solvent. Suitable solvents are those which are inactive with respect to the starting material compounds under the reaction conditions but are capable of dissolving at least one of the starting materials. Suitable solvents are, for example, ethers such as dioxane, amides such as dialkyl formamide, dialkyl acetamide, etc.; aromatic hydrocarbons such as xylene, toluene, etc.; esters such as the ethylene glycol monoethyl ether acetate sold under the trademark "Cellosolve acetate", 2-ethoxyethylacetate, etc.; halogenated hydrocarbons such as chloroform, ethylene dichloride, tetrachloroethylene, trichloroethylene sold under the trademark "Triclene", etc. The solvent should not interfere with the reactions with the polyamino acids or ANCA which are to be effected successively. The reaction proceeds sufficiently even at the normal temperatures without any solvent, but heat is usually applied, for example a temperature of about 160°C. or lower is desirable, or a suitable catalyst is used which will not substantially interrupt the next polymerization reaction of the ANCA.

The well-known catalysts used in the preparation of polyurethanes, for example, organic bases, organometallic compounds, and the like can be employed to accelerate the reaction rate. Typical catalysts include amines and substituted amines such as trimethylamine, triethylamine, tripropylamine (n- and iso-), tributylamine (n-, iso-, tert- and sec-), tripentylamine, trihexylamine, tricyclohexylamine, tricyclopentylamine, N,N-dimethyllaurylamine; alkanol- and substituted alkanolamines such as triethanolamine, methyldiethanolamine, dimethylethanolamine, ethyldiethanolamine, diethylethanolamine, tris (2-oxypropyl) amine; N,N-dimethylcyclohexylamine, triethylenediamine, N,N,N',N'-tetramethylmethanediamine, N,N,N',N'-tetraethylmethanediamine, N,N,N',N'-tetramethylethylenediamine, N,N,N',N'-tetraethylethylenediamine, N,N,N',N'-tetrakis (2-hydroxypropyl) ethylenediamine, N,N,N',N'-tetramethylpropylenediamine, N,N,N',N'-tetramethyl-1,3-butanediamine, N,N,N',N'-tetramethylhexamethylenediamine, N,N,N',N'',N''-pentamethyldiethylenetriamine, N,N,N',N'',N'''-hexamethyltriethylenetetramine, N,N,N',N'-tetraethyl-1,3-butanediamine; dimethylamine, diethylamine, dipropylamine, dibutylamine, dipentylamine, dihexylamine, dicyclopentylamine, dicyclohexylamine, triazine, morpholine, N-methylmorpholine, N-ethylmorpholine, piperidine, piperazine, N-methylpiperidine, N-ethylpiperidine, N,N'-dimethylpiperazine, N,N'-diethylpiperazine, pyridine, dibenzylamine, tribenzylamine, N-methylaniline, N-ethylaniline, N,N-dimethylaniline, N,N-diethylaniline, diphenylamine, triphenylamine, N,N,N',N'-tetramethyl-p-phenylenediamine, N,N,N',N'-tetraethylphenylenediamine; dialkyl tin diacetates such as dibutyl (or propyl, ethyl or methyl) tin diacetate; dialkyl tin dibutyrates such as dibutyl (propyl, ethyl or methyl) tin dibutyrate; dialkyl tin divalerates such as dibutyl (or propyl, ethyl or methyl) tin divalerate; dialkyl tin dioctanoates such as dibutyl (or propyl, ethyl or methyl) tin dioctanoate; dialkyl tin dilaurates such as dibutyl (or propyl, ethyl or methyl) tin dilaurate; alkyl tin trichlorides such as butyl (or propyl, ethyl or methyl) tin trichloride; dialkyl tin dichlorides such as dibutyl (or propyl, ethyl, or methyl) tin dichloride; dialkyl tin di-2-ethylhexanoates such as dibutyl (or propyl, ethyl or methyl) tin di-2-ethylhexanoate; metallic naphthenates such as zinc (or nickel, cobalt, iron, tin or lead) naphthenate; tin oleate; metallic octanoates such as iron (or nickel, cobalt or tin) octanoate; ferrocene; copper hexogen; iron acetylacetonate; and the like. These catalysts can be used alone or in mixture and may be diluted with or dissolved in or added to a suitable solvent. The catalyst is used in an amount corresponding to not more than 10 percent by mole weight based on the molecular weight of the polyesterpolyol initially used. In order to retain the isocyanate groups in the prepolymer, it is particularly desirable to use the diisocyanate in sufficient amount to consume all of the available free hydroxyl groups, but in a sufficiently small amount to avoid undersirable side reactions. Preferably, the amount of diisocyanate will be employed in slight excess over the amount of hydroxyl groups. However, when the reaction is not allowed to go to completion in preparing the prepolymer, the isocyanate groups and the hydroxyl groups are retained in the prepolymer. Therefore, in that case, it is not always necessary that the number of the isocyanate groups be in excess of the number of the hydroxyl groups. Accordingly, it is not always necessary that the amount of the diisocyanate compound used be greater than that of the polyol used, and the ratio of NCO/OH can suitably be in the range of between 0.2 and 4.0.

The prepolymer having terminal isocyanate groups is reacted with ANCA in the presence of a polymerization initiator or, alternatively, with a polyamino acid previously obtained by polymerizing ANCA. Also, if desired, the prepolymer can be reacted with a polyamino acid and then further reacted with ANCA. As the amino acid starting material for ANCA represented by said general formulas, acidic amino acids, neutral amino acids, and basic amino acids may be used. Examples of ANCA prepared from acidic amino acids include the NCA of $\omega$-substituted ester derivatives of amino acids represented by the general formulas:

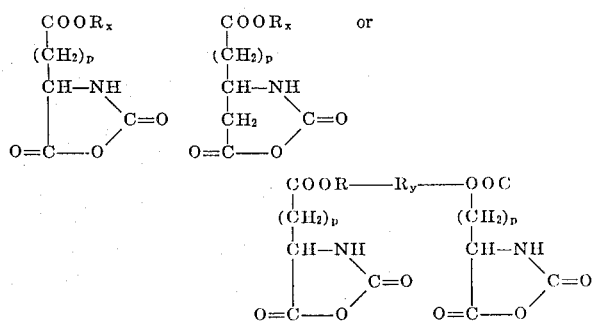

wherein $p$ represents an integer from 1 to 6; $R_x$ represents a monovalent hydrocarbon group such as a saturated or unsaturated aliphatic, alicyclic or aromatic group (including aliphatic groups having aromatic substituents and aromatic groups having aliphatic substituents) such as alkyl, cycloalkyl or aralkyl containing from 1 to 8 carbon atoms. These groups may also bear inert substituents such as halogen, nitro, cyano, alkoxy, carboalkoxy, carboaryloxy, carboalkaryloxy, carboaralkoxy, mono- or dialkylated amino acylamide, carboalkoxyamino and carboaralkoxyamino groups. $R_y$ represents a divalent hydrocarbon group such as an alkylene group containing from 1 to 6 carbon atoms. Typical compounds include, for example, NCAs of $\omega$-substituted esters of aspartic acid, glutamic acid, 2-aminoadipic acid, 2-aminopimelic acid, etc. The ANCA can be the NCA of a neutral amino acid such as glycine, alanine, $\alpha$-aminobutyric acid, 2,5-diaminoadipic acid, 2,5-diaminopimelic acid, 2,6-diaminopimelic acid, valine, norvaline, leucine, isoleucine, norleucine, phenylglycine, phenylalanine, tryptophan, proline, $\beta$-alanine, $\beta$-aminobutyric acid, $\beta$-aminoisovaleric acid, $\beta$-aminocaproic acid, O-substituted serine, O-substituted homoserine, O-substituted threonine, O-substituted tyrosine, O-substituted hydroxyproline, O-substituted hydroxytryptophan, S-substituted cysteine, cystine, methionine, etc. Typical useful NCAs of basic amino acids include, for example, NCAs of $N^{im}$-substituted histidine, N$\gamma$-substituted-$\alpha$, $\gamma$-diaminobutyric acid, $N^{\delta}$-substituted ornithine, $N^{\epsilon}$-substituted lysine, $N^{guanido}$-substituted arginine, etc. As the substitution protective groups of the functional groups of said amino acids, any of the well-known protective groups in the field of amino acids and peptides can be used.

The polymerization initiator can be any of the known initiators for polymerizing ANCA, including organic bases and organometallic compounds, such as alkyl lithium, dialkyl zinc, monoalkyl zinc, sodium alkoxide, potassium alkoxide, etc. can be used.

In the practice of this invention, ANCA or polyamino acid or mixtures thereof are generally used in amounts from 0.2 - 20 times the amount of the prepolymer having terminal isocyanate groups. However, the ratio of components can be varied as desired, depending upon the physical properties desired in the final polymer, for example, stretchability, adhesiveness, elastic resilience, feel, moisture permeability, touch, etc. Generally, when the amount of polyamino acid utilized is high, the physical properties of the polyamino acid are predominant. On the other hand, when the amount of polyamino acid is low, the physical properties of the polyurethane will predominate, and will reflect the kinds of polyesterpolyol and diisocyanate used. The preferred amounts of ANCA or polyamino acid or mixtures thereof is usually from 0.4 to 9 times the amount of urethane prepolymer. The polymerization temperature and time depend upon the combination of reactants, solvent used, etc., but when the reaction is carried out at a high temperature for a long period of time, considerable discoloring sometimes occurs. Therefore, it is preferred to carry out the reaction at temperatures less than 200°C. for a period of time of 1 to 20 hours. Since the reaction proceeds even at low temperatures, the reaction can be carried out at temperatures below room temperature for more than 20 hours. Usually, it is preferable to use a temperature of 0° - 120°C. When the prepolymer having terminal isocyanate groups is polymerized with a polyamino acid which has been prepared separately according to conventional processes, good results can be obtained by carrying out the reaction under the same conditions as described above but, in that case, it is desirable to complete the reaction by heating the reaction system just before the completion of the reaction.

The amount of polymerization initiator used in the reaction of the ANCA or polyamino acid with the urethane prepolymer depends upon the specific reaction mixture components, the object of the reaction and the initiator employed. Generally it is desirable to use the initiator in amounts from about 0.001 to 1.0 times (by mol) of the amount of ANCA or the constituent amino acid monomer used. When the polyamino acid is reacted with the prepolymer it is not necessary to add the initiator thereto. Polymerization is usually carried out in an inert solvent capable of dissolving at least one of the reactants. Suitable solvents include N,N-dialkylamines such as dialkyl formamide, dialkyl acetamide, N-alkyl-2-pyrrolidone, and halogenated hydrocarbons such as chloroform, 1,2-dichloroethane (ethylenechloride) trichloroethylene sold under the trademark Triclene, tetrachloroethylene, tetrachloroethane, methylene chloride, etc., dioxane, ethyl acetate, etc. These solvents can be used alone or in mixtures. Other solvents such as benzene, toluene, nitrobenzene, chlorobenzene, can also be added thereto. There is no particular limitation to the amount of such polymerization solvent to be used, so long as the amount is enough to form a good polymerization system, but usually the solvent is so used that the solid content is between 1 and 50 percent.

When films are prepared from the products of this invention, they have improved stretchability and elasticity. Synthetic leathers prepared from the products of the invention have a feel, drape, moisture permeability and touch which are similar to those of the natural leather, and also exhibit improved adhesion of the film to the substrate cloth. The surface film has good stretchability and is therefore suitable for use in shoes, furniture, clothing and the like.

When an aliphatic diisocyanate having ester groups, for example, ornithine diisocyanate alkyl ester, lysine diisocyanate alkyl ester, etc., is used, excellent solvent and light resistance are obtained, as well.

Examples showing the embodiments of the present invention are given below, but the present invention is not restricted thereto.

EXAMPLE 1

34.6 g. of a polyesterdiol consisting of adipic acid and diethylene glycol and having an OH value of 41 sold under the trademark Nippolan 1004 are reacted with 5.4 g. of lysine diisocyanate methyl ester at 100°C. for 3 hours with stirring to give a prepolymer having terminal isocyanate groups. Then, 450 g. of 1,2-dichloroethane are added thereto and, immediately thereafter, 73.0 g. of γ-methyl-L-glutamate N-carboxy anhydride are added and the mixture is stirred at room temperature. After one hour, 70 g. of N,N-dimethyl formamide are added followed by 1.31 g. of triethylamine as polymerization initiator and stirring is continued for 10 hours. The mixture is then heated close to its boiling point and the reaction is continued for one hour to give a viscous solution. On molding, the product forms a colorless, transparent film. The polymer solution shows very little yellowing even after 30 days and has very good light resistance, when compared with solutions prepared by the same process from other diisocyanates such as 4,4'-diphenylmethane diisocyanate or tolylene diisocyanate. The film is compared with a film of poly-γ-methyl-L-glutamate, and the results are shown below:

(The thickness of both films is 0.04 – 0.05 mm.)
The poly-γ-methyl-L-glutamate film:
Tensile strength: longitudinal: 3.0 kg./mm.$^2$;
lateral: 5.0 kg./mm.$^2$
Elongation: longitudinal: 90% lateral: 110%
The modified γ-methyl-L-glutamate-urethane film:
Tensile strength: longitudinal: 3.0 kg./mm.$^2$;
lateral: 5.0 kg./mm.$^2$
Elongation: longitudinal: 450 % lateral: 500%

When the polymerization solution is applied onto a cotton suede, in the conventional manner for preparing synthetic leather, a film having a strong adhesiveness which requires almost no additional adhesive is formed.

EXAMPLE 2

To 32.8 g. of a polyesterdiol consisting of adipic acid and ethylene glycol and having an OH value of 56 sold under the trademark Nippolan 4040, 8.5 g. of ornithine diisocyanate ethyl ester and 40 g. of dioxane are added and a reaction is carried out at 100°C. for 50 minutes with stirring, to give a prepolymer having terminal isocyanate groups. Immediately, a polymerization solution obtained separately by polymerizing 70.0 g. of γ-methyl-L-glutamate N-carboxy anhydride in 450 g. of 1,2-dichloroethane using 2.0 g. triethylamine as an initiator is added thereto. The resulting mixture solution is heated to 75° – 80°C. for one hour with stirring to give a polymerization solution having a viscosity of 1,500 – 2,000 cps. The film obtained from the polymerization solution according to conventional processes has physical properties similar to those of the polymer obtained in Example 1.

EXAMPLE 3

A polymer solution is obtained according to the procedures of Example 1, except that 6.4 g. of 4,4'-diphenylmethane diisocyanate is used in place of 5.4 g. of lysine diisocyanate methylester. The solution has a light resistance inferior to that of the polymer solution of Example 1, but has better adhesiveness and stretchability than the poly-γ-methyl-L-glutamate film as indicated from the following data:

(Thickness of both films was 0.04 - 0.05 mm.)
Tensile strength: longitudinal: 3.0 kg./mm.$^2$;
lateral: 5.0 kg./mm.$^2$
Elongation: longitudinal: 500% lateral: 600%

EXAMPLE 4

A polyesterdiol having an OH value of 75 obtained by a condensation polymerization of phthalic anhydride and tetramethylene glycol is reacted with 48 g. of tolylene diisocyanate at 100°C. for 25 hours with stirring, to give a prepolymer having terminal isocyanate groups. Immediately, 800 g. of 1,2-dichloroethane are added thereto, followed by 250 g. of N$\cdot$ -carbobenzoxy-L-lysine N-carboxy anhydride and stirring at room temperature for one hour. 150 g.

of N,N-diethyl acetamide are then added thereto followed by 2.35 g. of tri-n-butylamine, a polymerization initiator, and stirring is continued for 15 hours. The mixture is then heated close to the boiling point for one hour to give a viscous solution. The solution is inferior in light resistance properties to the polymer solution of Example 1, but superior in the adhesiveness and stretchability of the film compound to the single film poly-N$^\epsilon$-carbobenzoyl-L-lysine.

EXAMPLE 5

24 g. of a polyesterdiol having an OH value of 56 obtained from a mixture of adipic acid and phthalic acid in a mole ratio of 1:1 and ethylene glycol and 5.0 g. of lysine diisocyanate methyl ester are reacted at 100°C. for 3 hours with stirring to give a prepolymer having terminal isocyanate groups. 80 g. of N,N-dimethyl formamide, 40 g. of chloroform and 40 g. of dioxane are then added and dissolved. Further, 20 g. of N-carboxy anhydride of β-alanine are added followed by 0.3 g. of triethylene diamine, an initiator, and stirring is continued for 5 hours. The mixture is then heated close to the boiling point for 2 hours to give a viscous solution. The adhesiveness and stretchability of the solution are as good as these properties of the film of Example 1.

EXAMPLE 6

50 g. of dioxane are added to the mixture of 24 g. of a polyesterdiol having an OH value of 56 obtained from a mixture of adipic acid and phthalic acid in a molar ratio of 1:1 and ethylene glycol and 3.0 g. of lysine diisocyanate methyl ester, and reacted at 100°C. for 3 hours with stirring to give a prepolymer having terminal isocyanate groups. Immediately, a polymer solution obtained separately by polymerizing 90.0 g. of γ-benzyl-D-glutamate N-carboxy anhydride in 770 g. of 1,1,2,2-tetrachloroethane and 1.0 g. of triethylamine as a polymerization initiator are added thereto.

The mixture solution is heated to 75° – 80°C. for one hour with stirring to give a polymerization solution having a viscosity of 2,000 – 3,000 cps.

The film obtained from the polymerization solution in the conventional manner shows physical properties similar to those of the film obtained in Example 1 and superior in stretchability and adhesiveness to the poly-γ-benzyl-D-glutamate film.

EXAMPLE 7

20.0 g. of a polyesterdiol having an OH value of 56 and consisting of adipic acid and ethylene glycol sold under the trademark Nippolan 4040 are reacted with 4.2 g. of lysine diisocyanate methyl ester at 100°C. for 1.5 hours to give a prepolymer having terminal isocyanate groups. Immediately, 16.0 g. of N,N-dimethyl formamide and 200 g. of 1,2-dichloroethane are added thereto and the mixture is stirred to obtain a uniform solution. Then, a polymerization solution having a viscosity of 1,000 cps. at 20°C. botained separately by polymerizing 98.0 g. of γ-methyl-L-glutamate N-carboxy anhydride in 675 g. of 1,2-dichloroethane using 1.8 g. of triethylamine as a polymerization initiator is added thereto. This solution is heated to 75° – 80°C. for one hour with stirring to give a polymerization solution having a viscosity of 850 cps. The film obtained from the polymerization solution according to conventional processes shows physical properties similar to those of the film obtained in Example 1, and has a very good light resistance.

EXAMPLE 8

27.0 g. of a polyesterdiol having an OH value of 41 and consisting of adipic acid and diethylene glycol sold under the trademark Nippolan 1004 are reacted with 4.2 g. of lysine diisocyanate methyl ester in 31 g. of dioxane at 100°C. for 2.5 hours with stirring to give a prepolymer having terminal isocyanate groups. Then, a polymerization solution obtained separately by polymerizing 11.0 g. of γ-methyl-L-glutamate N-carboxy anhydride in a solvent mixture of 774 g. of 1,2-dichloroethane and 70 g. of N,N-dimethyl formamide using 1.7 g. of triethylamine as a polymerization initiator at room temperature for 20 minutes is added thereto and reacted at room temperature for 30 minutes with stirring. Immediately, 91.0 g. of γ-methyl-L-glutamate N-carboxy anhydride are added thereto and heated to 75° – 80°C. and reacted for two hours with stirring to give a modified polyamino acid solution. The film obtained from the polymerization solution according to conventional processes shows physical properties similar to those of the film obtained in Example 1 and has a very good light resistance.

EXAMPLES 9 – 17

Prepolymers are prepared according to the following procedure, using the components as shown in Table 1. A diisocyanate component, a solvent A and a catalyst are added to a polyesterpolyol component, and stirred at 80° – 100°C. for 3 hours to obtain prepolymers.

A solvent B as shown in Table 2 is added to the prepolymer, and then the ANCA component is added thereto and stirred at room temperature for one hour. A polymerization initiator is then added and the reaction is continued for 10 hours. Then, a polymer solution is obtained by heat treatment at 80°C. for one hour. A colorless, transparent film prepared from the solution has a far improved stretchability and adhesiveness, as compared with the film obtained from the polyamino acid alone.

TABLE 1

| Example | Diisocyanate component | Grams | Polyesterpolyol component [1] | | | | | | |
|---------|------------------------|-------|-------|-------|------------------|----------------|-----------|-----------------|-------|
| | | | Dibasic acid or lactone | Polyol | Molecular weight | Amount, grams | Catalyst | Solvent A | Grams |
| 9 | 4,4'-diphenyl-methane diisocyanate. | 10 | Succinic acid | Propylene glycol | 1,350 | 24 | No addition | Dioxane | 40 |
| 10 | 2,4-tolylene diisocyanate. | 28 | Dimerized linolenic acid. | Hexamethylene glycol. | 1,500 | 100 | do | N,N-dimethyl formamide. Dioxane. | 30  30 |
| 11 | Lysine diisocyanate ethyl ester. | 8.5 | Azelaic acid | 1,3-butanediol | 2,000 | 40 | Triethylamine, 0.05 g. | N,N-dimethyl formamide. | 30 |
| 12 | Ornithine diisocyanate ethyl ester. | 8.9 | Phthalic acid | Diethylene glycol | 1,380 | 46 | N-methyl-morpholine, 0.04 g. | 2-ethoxyethyl acetate. | 50 |

TABLE 1—Continued

| Example | Diisocyanate component | Grams | Polyesterpolyol component [1] | | | | Catalyst | Solvent A | Grams |
|---|---|---|---|---|---|---|---|---|---|
| | | | Dibasic acid or lactone | Polyol | Molecular weight | Amount, grams | | | |
| 13 | Hexane-1,6-diisocyanate | 10 | ε-caprolactone | Ethylene glycol | 500 | 50 | Dimethylethanolamine, 0.05 g. | Dioxane | 30 |
| 14 | Cyclohexyl-methane-4,4'-diisocyanate | 10 | Phthalic acid, adipic acid (1:1) | do | 600 | 35 | Dibutyl-tin dilaurate, 0.03 g. | do | 30 |
| 15 | 4,4'-diphenyl-methane diisocyanate | 24 | Adipic acid | Diethylene glycol, trimethylolpropane (10:1) | 1,600 | 35 | No addition | do | 30 |
| 16 | Lysine diisocyanate methyl ester | 9.0 | do | Ethylene glycol, propylene glycol (1:1) | 2,000 | 40 | do | do | 30 |
| 17 | 2,2-bis(4-isocyanato-phenyl)propane | 13.9 | do | Tetramethylene glycol | 1,400 | 35 | do | do | 30 |

TABLE 2

| Example | ANCA component | Grams | Solvent B | Grams | Polymerization initiator | Grams |
|---|---|---|---|---|---|---|
| 9 | γ-ethyl-L-glutamate NCA | 75 | Perclene / 1,2-dichloroethane | 150 / 450 | Triethylamine | 1.5 |
| 10 | γ-isobutyl-L-glutamate NCA | 70 | Triclene | 800 | Tri-n-butylamine | 1.0 |
| 11 | γ-cyclohexyl-L-glutamate NCA | 70 | 1,2-dichloroethane | 850 | Diethylamine | 1.3 |
| 12 | β-ethyl-L-aspartate NCA | 65 | Triclene / 1,2-dichloroethane | 100 / 700 | Triethanolamine | 1.1 |
| 13 | L-methionine NCA | 50 | 1,1,2,2-tetrachloroethane | 400 | Triethylenediamine | 1.3 |
| 14 | γ-methyl-L-glutamate NCA / L-leucine NCA | 30 / 30 | N,N-dimethylformamide / 1,2-dichloroethane | 400 / 350 | Triethylamine | 1.2 |
| 15 | γ-methyl-L-glutamate NCA / D-alanine NCA | 30 / 40 | N,N-dimethylformamide / 1,2-dichloroethane | 200 / 350 | Diethylamine | 1.5 |
| 16 | O¹,O²-di(γ-glutamyl)ethylene glycol NCA | 60 | Dimethyl sulfoxide / 1,2-dichloroethane | 100 / 700 | Triethylamine | 2.1 |
| 17 | β-n-butyl-L-aspartate NCA | 142 | N,N-dimethylformamide / 1,2-dichloroethane | 200 / 900 | Triethylamine | 1.7 |

What we claim is:

1. Amino acid-urethane polymer compositions comprising the product obtained by
   I. reacting
   A. an intermediate polymer having isocyanate groups at the terminals thereof obtained by the reaction of a polyesterpolyol with a polyisocyanate compound, with
   B. an amino acid compound selected from the group consisting of
      a. an amino acid N-carboxy anhydride of the general formulas:

(1) 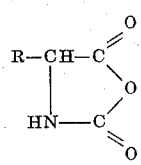

(2) 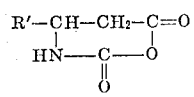

(3) 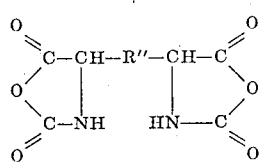

(4) 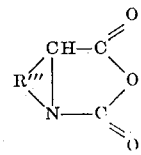

(5) 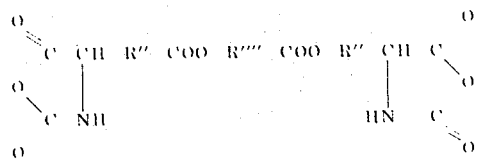

wherein R and R' are hydrogen or monovalent hydrocarbon groups selected from the group consisting of alkyl groups containing from 1 to 6 carbon atoms, aralkyl groups containing from 6 to 10 carbon atoms, hydroxyalkyl groups containing from 1 to 6 carbon atoms, hydroxyaralkyl groups containing from 6 to 10 carbon atoms, thioalkyl groups containing from 1 to 6 carbon atoms, aminoalkyl groups containing from 1 to 6 carbon atoms or one of the following groups

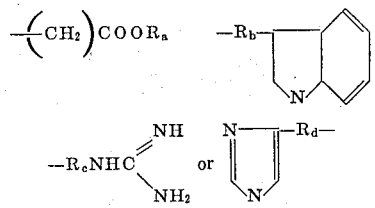

wherein n is an integer from 1 to 6, $R_a$ is an alkyl, cycloalkyl or aralkyl group containing from 1 to 8 carbon atoms and $R_b$, $R_c$ and $R_d$ are alkylene groups containing from 1 to 6 carbon atoms; R'', R''' and R'''' are alkylene groups containing from 1 to 6 carbon atoms in the presence of an organic base of an amine having one or no active hydrogen atoms or an organometallic compound; and b. a polyamino acid obtained by polymerizing an amino acid N-carboxy anhydride of the general formulas:

(1) 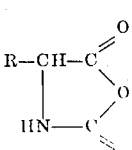

(2)

(3)

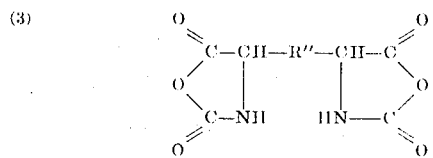

(4)

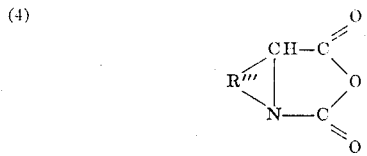

(5)

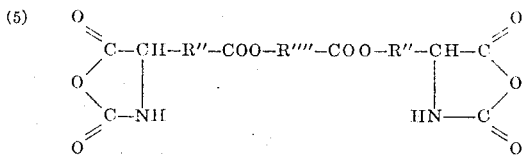

wherein R and R' are hydrogen or monovalent hydrocarbon groups selected from the group consisting of alkyl groups containing from 1 to 6 carbon atoms, aralkyl groups containing from 6 to 10 carbon atoms, hydroxyalkyl groups containing from 1 to 6 carbon atoms, hydroxyaralkyl groups containing from 6 to 10 carbon atoms, thioalkyl groups containing from 1 to 6 carbon atoms, aminoalkyl groups containing from 1 to 6 carbon atoms or one of the following groups

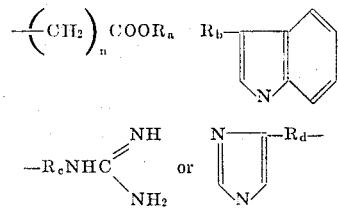

wherein n is an integer from 1 to 6, $R_a$ is an alkyl, cycloalkyl or aralkyl group containing from 1 to 8 carbon atoms and $R_b$, $R_c$ and $R_d$ are alkylene groups containing from 1 to 6 carbon atoms; R'', R''' and R'''' are alkylene groups containing from 1 to 6 carbon atoms in the presence of an organic base of an amine having one or no active hydrogen atom or an organometallic compound.

2. The composition of claim 1 wherein the polyesterpolyol is the reaction product of a polycarboxylic acid containing from 2 to 20 carbon atoms and a polyol selected from the group consisting of diols and triols containing from 2 to 20 carbon atoms and has a molecular weight in the range of about 200 to 10,000.

3. The composition of claim 1 wherein the polyesterpolyol is formed from one or two of acids selected from the group consisting of adipic acid, phthalic acid and one or more of glycols selected from the group consisting of ethylene glycol, tetramethylene glycol and diethylene glycol.

4. The composition of claim 1 wherein the polyisocyanate compound comprises a compound selected from the group consisting of aliphatic, cycloaliphatic and aromatic diisocyanate compounds containing from 6 to 17 carbon atoms including carbon atoms in NCO groups.

5. The composition of claim 1 wherein the polyisocyanate compound comprises lysine diisocyanate methyl ester.

6. The composition of claim 1 wherein the amino acid compound is an amino acid N-carboxy anhydride.

7. The composition of claim 1 wherein the amino acid compound comprises γ-alkyl-L-glutamate N-carboxy anhydride wherein alkyl has from 1 to 4 carbon atoms.

8. A process of preparing amino acid-urethane polymer compositions comprising
 I. reacting
  A. an intermediate polymer having isocyanate groups at the terminals thereof obtained by the reaction of a polyesterpolyol with a polyisocyanate compound, with
  B. an amino acid compound selected from the group consisting of
   a. an amino acid N-carboxy anhydride of the general formulas:

(1)

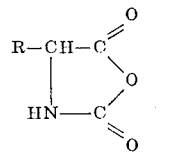

(2)

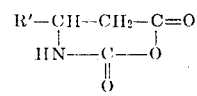

(3)

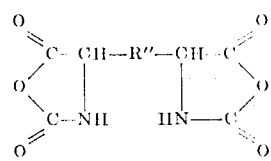

(4)

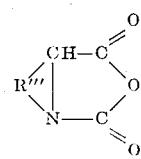

(5)

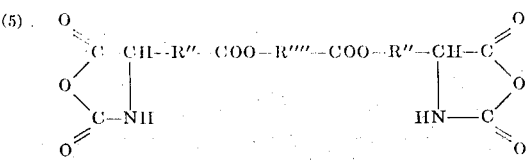

wherein R and R' are hydrogen or monovalent hydrocarbon groups selected from the group consisting of alkyl groups containing from 1 to 6 carbon atoms, aralkyl groups containing from 6 to 10 carbon atoms, hydroxyalkyl groups containing from 1 to 6 carbon atoms, hydroxyaralkyl groups containing from 6 to 10 carbon atoms, thioalkyl groups containing from 1 to 6 carbon atoms, aminoalkyl groups containing from 1 to 6 carbon atoms, or one of the following groups

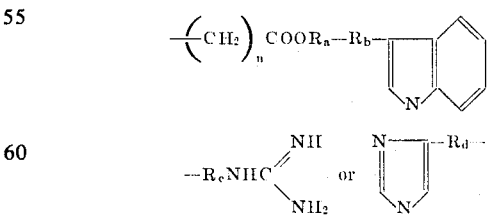

wherein n is an integer from 1 to 6, $R_a$ is an alkyl, cycloalkyl or aralkyl group containing from 1 to 8 carbon atoms and $R_b$, $R_c$ and $R_d$ are alkylene groups containing from 1 to 6 carbon atoms; R'', R''' and R'''' are alkylene groups containing from 1 to 6 carbon atoms in the presence of an organic base of an amine having one or no active hydrogen atom or an organometallic compound; and b. a polyamino acid obtained by polymerizing an amino acid N-carboxy anhydride of the general formulas:

(1) 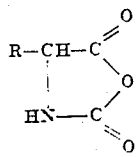

(2) 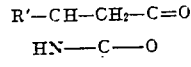

(3) 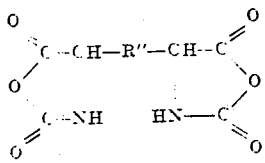

(4) 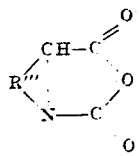

(5) 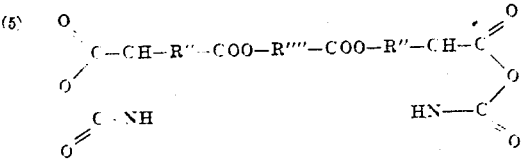

wherein R and R' are hydrogen or monovalent hydrocarbon groups selected from the group consisting of alkyl groups containing from 1 to 6 carbon atoms, aralkyl groups containing from 6 to 10 carbon atoms, hydroxyalkyl groups containing from 1 to 6 carbon atoms, hydroxyaralkyl groups containing from 6 to 10 carbon atoms, thioalkyl groups containing from 1 to 6 carbon atoms, aminoalkyl groups containing from 1 to 6 carbon atoms, or one of the following groups

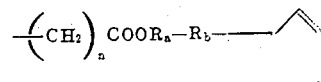

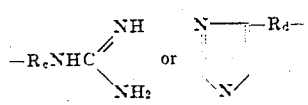

wherein n is an integer from 1 to 6, $R_a$ is an alkyl, cycloalkyl or aralkyl group containing from 1 to 8 carbon atoms and $R_b$, $R_c$ and $R_d$ are alkylene groups containing from 1 to 6 carbon atoms; R'', R''' and R'''' are alkylene groups containing from 1 to 6 carbon atoms in the presence of an organic base of an amine having one or no active hydrogen atom or an organometallic compound.

9. The process of claim 8 wherein the polyester-polyol is the reaction product of a polycarboxylic acid containing from 2 to 20 carbon atoms and a polyol selected from the group consisting of diols and triols containing from 2 to 20 carbon atoms and has a molecular weight in the range of about 200 to 10,000.

10. The process of claim 8 wherein the polyisocyanate compound comprises a compound selected from the group consisting of aliphatic, cycloaliphatic and aromatic diisocyanate compounds containing from 6 to 17 carbon atoms including carbon atom in N-carboxy anhydride.

11. The process of claim 8 wherein the amino acid compound is an amino acid N-carboxy anhydride.

12. The process of claim 8 wherein the amino acid compound comprises β-alkyl-L-aspartate-N-carboxy anhydride wherein the alkyl has from 1 to 4 carbon atoms.

* * * * *